(12) United States Patent
Kikukawa et al.

(10) Patent No.: US 6,246,652 B1
(45) Date of Patent: Jun. 12, 2001

(54) DEVICE USING SENSOR FOR SMALL ROTATION ANGLE

(75) Inventors: Atsushi Kikukawa, Higashimurayama; Sumio Hosaka, Nishitama-gun; Hajime Koyanagi, Koshigaya; Kimitoshi Etoh, Hachioji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/205,399

(22) Filed: Dec. 4, 1998

(30) Foreign Application Priority Data

Dec. 5, 1997 (JP) .................................... 9-335275

(51) Int. Cl.⁷ ................................. G11B 3/90; G11B 3/00
(52) U.S. Cl. ......................................... 369/53.38; 369/128
(58) Field of Search ............................... 369/43, 126, 127, 369/128, 44.32, 135, 44.11, 44.41, 53.11, 53.19, 53.25, 53.26, 53.12, 53.38; 250/306, 307

(56) References Cited

U.S. PATENT DOCUMENTS

| | | |
|---|---|---|
| 5,436,448 | 7/1995 | Hosaka et al. . |
| 5,467,642 | 11/1995 | Hosake et al. . |
| 5,471,064 | 11/1995 | Koyanagi et al. . |
| 5,537,372 * | 7/1996 | Albrecht et al. ................ 369/49 |

FOREIGN PATENT DOCUMENTS

| | | |
|---|---|---|
| 290648 | 11/1988 | (EP) . |
| 5-079834 | 3/1993 | (JP) . |
| 5-87548 | 4/1993 | (JP) . |
| WO97/35308 | 9/1997 | (WO) . |

OTHER PUBLICATIONS

Physical Review Letters, vol. 56, No. 9, Mar. 3, 1986, "Atomic Force Microscope", G. Binnig et al, pp. 930–933.
Applied Physical Letters, vol. 53, No. 12, Sep. 19, 1988, "Novel Optical Approach to Atomic Force Microscopy", G. Meyer et al, pp. 1045–1047.

* cited by examiner

Primary Examiner—Paul W. Huber
(74) Attorney, Agent, or Firm—Mattingly, Stanger & Malur, P.C.

(57) ABSTRACT

A recording and reproducing or observing apparatus based on a laser beam deflection detection method in which an object has a very small area for reflecting light. A laser beam emitted by a semiconductor laser diode passes through a collimator lens and a stop. The beam passes through the lens and stop and is reflected by a polarization beam splitter and focused by an objective lens onto a surface of a cantilever. Reflected light from the cantilever surface is focused by the lens before being received by a position sensor. Either the incident light or the reflected light passes through an optical path that is substantially 90 degrees relative to the optical axis of the other light.

9 Claims, 8 Drawing Sheets

DEVICE USING SENSOR FOR SMALL ROTATION ANGLE

BACKGROUND OF THE INVENTION

The present invention relates to a device using a sensor for a small rotation angle. More particularly, the invention relates to a device using a sensor capable of detecting a small rotation angle of an object that has a small area for reflecting light.

Since atomic force microscopy was first proposed by G. Binning inPhys. Rev. Letters Vol. 58, No. 9, pp. 930 (1986), a number of improvements have been made on the technology and new applications thereof have been undertaken. Illustratively, European Patent Laid-Open No. 290648 (Nov. 17, 1988) proposes a method for eliminating disadvantages involved in detecting the displacement of a cantilever by use of a tunneling current, the proposed method detecting the cantilever displacement in terms of capacitance or optical interference. In Appl. Phys. Lett. 53(12), Sep. 19, 1988, pp. 1045–1047, G. Meyer et al propose a laser beam deflection detection method under the title of "Novel optical approach to atomic force microscopy." This method is intended to remove deficiencies stemming from detecting the cantilever displacement by optical interference.

To such advances in atomic force microscopy, the inventors of the present invention have also contributed some improvements that go beyond the traditional scope of atomic force microscope. Specifically, they have proposed, among others, such applications as "Surface observing apparatus" in U.S. Pat. No. 5,436,448, "Scanning probe microscope and method of control error correction" in U.S. Pat. No. 5,467,642, "Precision machining method, precision machining apparatus and data storage apparatus using the same" in U.S. Pat. No. 5,471,064, and "A device for recording information in a size of several tens of nanometers or less by applying the principle of an atomic force microscope" in U.S. patent application Ser. No. 09/142,663.

In the devices proposed above, the displacement of a free end of the cantilever is detected as a small rotation angle through the use of the laser beam deflection detection method proposed by G. Meyer et al. Today, this method is one of the most commonly utilized techniques for detecting a small rotation angle of the cantilever.

The laser beam deflection detection method works primarily as follows: light from a light source is first reflected on a surface of a measuring object. When the measuring object (i.e., its reflecting surface) is rotated by an angle of $\theta$, reflected light is changed in orientation by an angle of $2\theta$ in the same direction as that of the rotation of the measuring object according to the principle of reflection. If the angle $\theta$ is sufficiently small, a beam of reflected light is displaced from its initial position by $2L\theta$ at a distance of L from the reflecting surface. If the distance L is sufficiently long, the displacement of the light beam may be made large enough to allow the rotation angle of the measuring object to be sensed by a detector for detecting light spot displacement.

SUMMARY OF THE INVENTION

In conventional devices incorporating or applying atomic force microscopy, their cantilevers typically measure a few hundred $\mu$m long and tens of $\mu$m wide each. Where the size of a measuring object is on such a small order, a sufficient quantity of reflected light is obtained by having light from a light source focused through a lens onto the measuring object placed at a focal point. Hence the need for limiting the incident light to a sufficiently small light beam. According to the laser beam deflection detection method, the focused laser beam spot typically has a diameter of tens of microns.

Where the head of a recording and reproducing apparatus is implemented in the form of a cantilever, as in the case of the above-cited U.S. Pat. No. 5,471,064 or U.S. patent application Ser. No. 09/142,663, there is a problem: the data read rate is limited by the resonance frequency of the cantilever. To increase the read rate requires enlarging the resonance frequency of the cantilever while keeping its spring constant sufficiently small. This makes it mandatory to reduce the overall size of the cantilever. A cantilever with a resonance frequency on the megahertz order may be fabricated effectively by reducing its total length to 10 microns or less, with some variations allowed depending on the thickness.

Cantilevers as short as 10 microns require that the spot diameter of the laser beam emitted thereto be reduced correspondingly; otherwise reflecting efficiency will suffer. Illustratively, for a cantilever with a total length of 10 microns, the laser beam emitted thereto must have a spot diameter of about 5 microns. In the future, cantilevers are expected to be further reduced in size, i.e., to 1 to 5 microns in overall length.

The operating range of the microscope (i.e., surface observing apparatus) based on atomic force microscopy is also restricted by the resonance frequency of a cantilever used therein, as is the case with recording and reproducing apparatuses. Improving the scanning speed of the cantilever shortens the time it takes the microscope to observe objects; this also requires the use of a cantilever having a high resonance frequency.

Some non-contact scanning type force microscopes function advantageously when utilizing a cantilever with a high resonance frequency. There is a case in which periodically timed potential signals occurring on the surface of a sample are detected directly in terms of deflection of a cantilever, the deflection being caused by electrostatic force acting between the sample surface and the cantilever. In that case, it is obvious that the higher the resonance frequency of the cantilever, the higher the frequency changes that may be detected.

DESCRIPTION OF THE PREFERRED EMBODIMENTS

Figure 1:
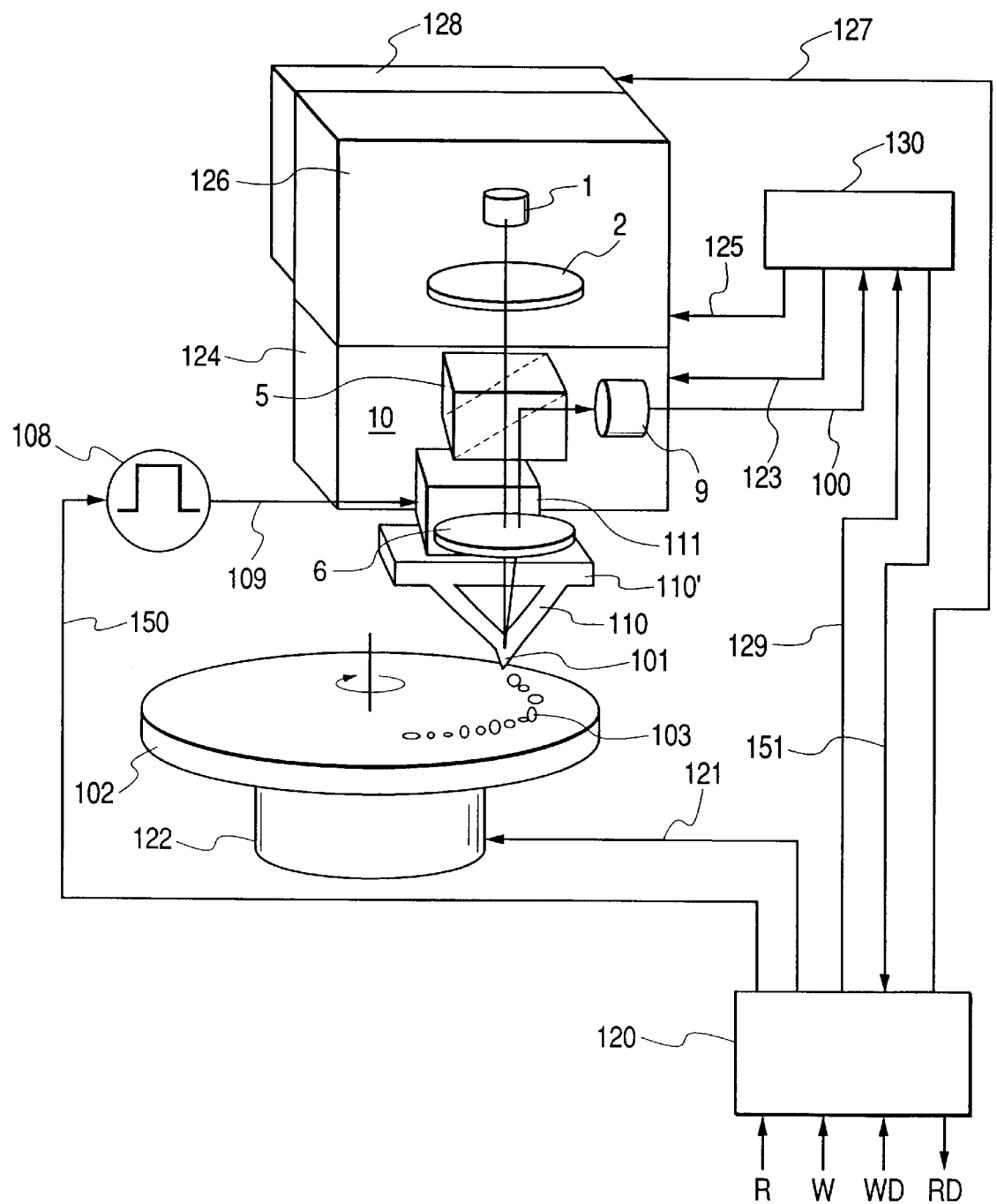
FIG. 1 is a schematic view of a recording and reproducing apparatus practiced as an embodiment of this invention.

FIG. 1 is a schematic view showing a typical constitution of a recording and reproducing apparatus embodying this invention. The embodiment utilizes the above-described type of atomic force microscope.

Reference numeral 122 denotes a disk drive motor and 102 represents a disk recording medium. The recording medium 102 is rotated by the motor 122. Reference numeral 101 stands for a probe and 110 for a cantilever (with a cantilever spring). A tip of the cantilever 110 is furnished with the probe 101 made of silicon (Si) doped with impurity elements. The cantilever 110 is mounted on a base 110' forming an integrated structure fabricated by semiconductor fabrication techniques. Where AFM force modulation recording is carried out, the disk recording medium 102 should naturally have a lower degree of hardness than the probe 101. Reference numeral 111 denotes a piezo electric device. The base 110' of the cantilever 110 is attached to one end of the piezo electric device 111. The tip of the probe 101 is formed illustratively to have a curvature radius of 20 nm or less.

Reference numeral 108 represents a pulse voltage source which is fed with a signal 150 to be recorded to the recording medium 102 and which supplies voltage pulses 109 to the piezo electric device 111. Giving voltage pulses 109 to the piezo electric device 111 applies to the probe 101 a force F to be defined below, which pushes the probe 101 towards the recording medium 102. The mechanical pressure forms on the recording medium 102 concave structures 103 reflecting the signals to be recorded. The force F is defined as $F = kX$ where k stands for a spring constant of the cantilever 110 and X for deflection of the cantilever 110. If the spring constant k is 1 N/m and if the displacement X is $1\mu$, then the force F applied to the probe 101 is $10^{-6}$ N. The magnitude of this force, involving some variations depending on the material of the recording medium 102, is large enough to produce plastic deformation representing recorded data.

The piezo electric device 111 is fixed by a Z-fine actuator 124 which in turn is retained by a Z-coarse actuator 126. The Z-coarse actuator 126 is fastened by a track control actuator 128. A main controller 120 receives a write instruction signal W, a read instruction signal R and a write data signal WD from the outside, and outputs a read data signal RD. The main controller 120 also sends a drive signal 121 to the motor 122, a drive signal 127 to the track control actuator 128, a control signal 129 to a Z-drive controller 130, and the signal 150 to the recording medium 102. The signal 150 corresponds to the write data signal WD and constitutes what needs to be recorded. An output 100 of a position sensor 9 for use with a rotation angle detector 10, to be described later, is input to the Z-drive controller 130. The Z-drive controller 130 outputs over a signal line 151 the read data signal RD to the main controller 120. From the main controller 120, the read data signal RD is forwarded to the outside. As will be described later, the control signal 129 is used as a trigger to initialize a relative positional relationship between the probe 101 and the recording medium 102.

The motor 122 is driven by the drive signal 121, the Z-fine actuator 124 by the drive signal 123, and the Z-coarse actuator 126 by a drive signal 125 as well as by the drive signal 127. The motor 122 and track control actuator 128 are held in a main body, not shown, of the recording and reproducing apparatus. In this setup, the probe 101 moves over the surface of the recording medium 102 in accordance with the drive signals 123, 125 and 127, and forms the concave structures 103 reflecting the signal 150 to be recorded while the voltage pulses 109 are being supplied.

The recording and reproducing apparatus embodying the invention is not limited to the above-described type having the recording medium 102 rotated as illustrated. Alternatively, the recording medium may be driven in the X and Y directions.

The rotation angle detector 10 will now be described. The detector 10 serves to read recorded information, and is used to initialize the probe 101.

Reference numeral 1 stands for a semiconductor laser diode and 2 for a collimator lens. A laser beam emitting surface of the semiconductor laser diode 1 is positioned at the focal point of the collimator lens 2. A laser beam emitted by the semiconductor laser diode 1 is converted by the collimator lens 2 into parallel rays. The parallel rays pass through a beam splitter 5 and are focused by an objective lens 6 onto the tip of the cantilever 110. The light reflected by the tip surface of the cantilever 110 is converted by the objective lens 6 into parallel rays. If the reflecting surface is perpendicular to the optical axis of the objective lens 6, the reflected light rays trace the incident optical path back to the cantilever 110 before reaching the beam splitter 5. The reflected light is bent by the beam splitter 5 by 90 degrees in its optical path before reaching the position sensor 9. If the reflecting surface is rotated within a predicted small range relative to a perpendicular to the optical axis of the objective lens 6, then the reflected light rays deviate somewhat from the incident optical path to the cantilever 110 but trace through a predetermined effective optical range back to the beam splitter 5. The reflected light is then bent by the beam splitter 5 by 90 degrees before reaching the position sensor 9. As with the motor 122 and track control actuator 128, the rotation angle detector 10 is housed in the main body, not shown, of the recording and reproducing apparatus.

Figure 2A:
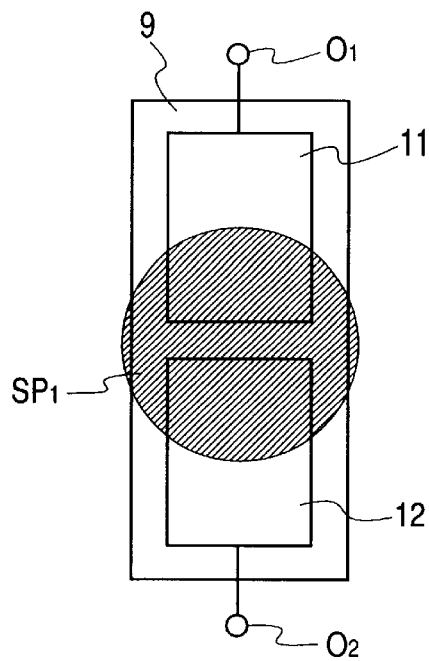
FIGS. 2A through 2D are schematic views each showing how a position sensor 9 is structured and how an incident light spot is positioned thereon.
Figure 2B:
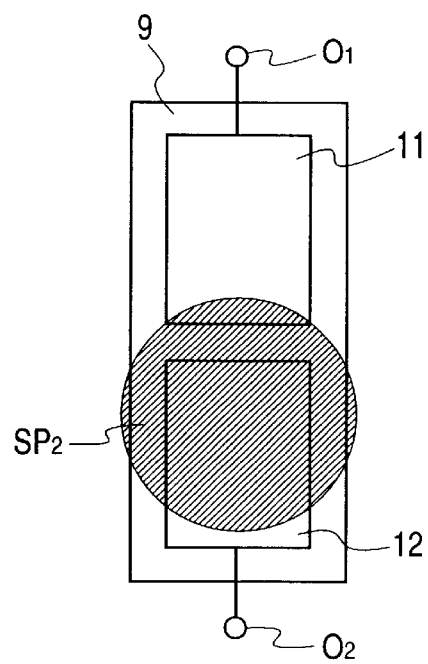
Figure 2C:
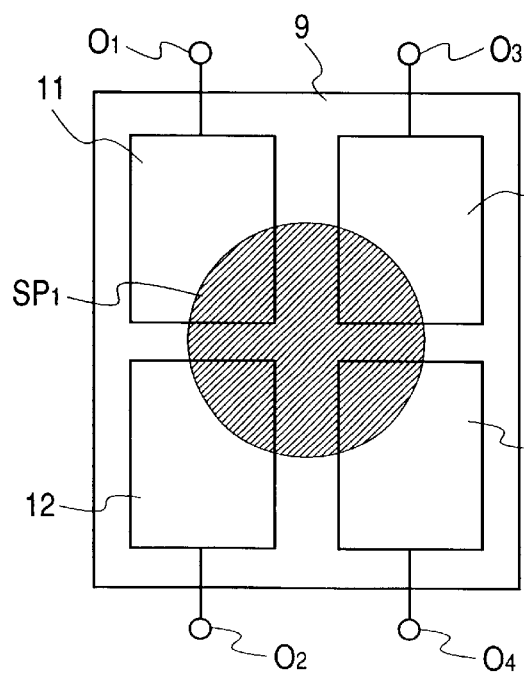
Figure 2D:
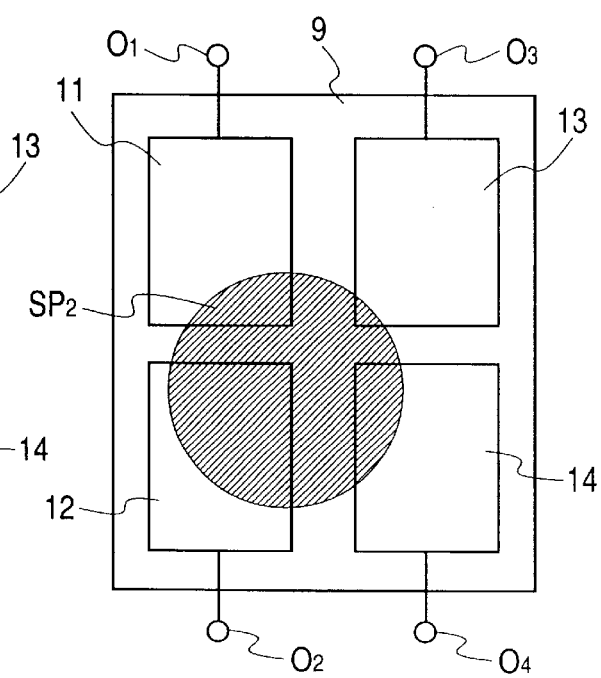

Each of FIGS. 2A through 2D schematically shows how the position sensor 9 is structured and how an incident light spot is positioned thereon. As illustrated, the position sensor 9 is constituted either by a two photo-diodes 11 and 12 or by four photo-diodes 11 through 14. When the component photo-diodes receive reflected light ($SP_1$, $SP_2$) from the cantilever 110, each of the diodes generates a current corresponding to the quantity of light received and outputs the current to a grounding point from each of output terminals $O_1$ through $O_4$. The above-mentioned output 100 of the position sensor 9 is an output that lumps together these output currents. FIG. 2A shows an example in which the cantilever 110 is in an initialized state, with the reflected light $SP_1$ hitting the diodes 11 and 12 in equal quantities. FIG. 2B depicts a case where the cantilever 110 is rotated slightly from its initialized position, with a greater portion of the reflected light $SP_2$ hitting the diode 12. FIG. 2C gives an example in which the cantilever 110 is initialized, with equal portions of the reflected light $SP_1$ hitting the diodes 11 through 14. FIG. 2D illustrates a case wherein the cantilever 110 is rotated and tilted a little from its initialized position, with the largest portion of the reflected light $SP_2$ hitting the diode 12.

Figure 3:
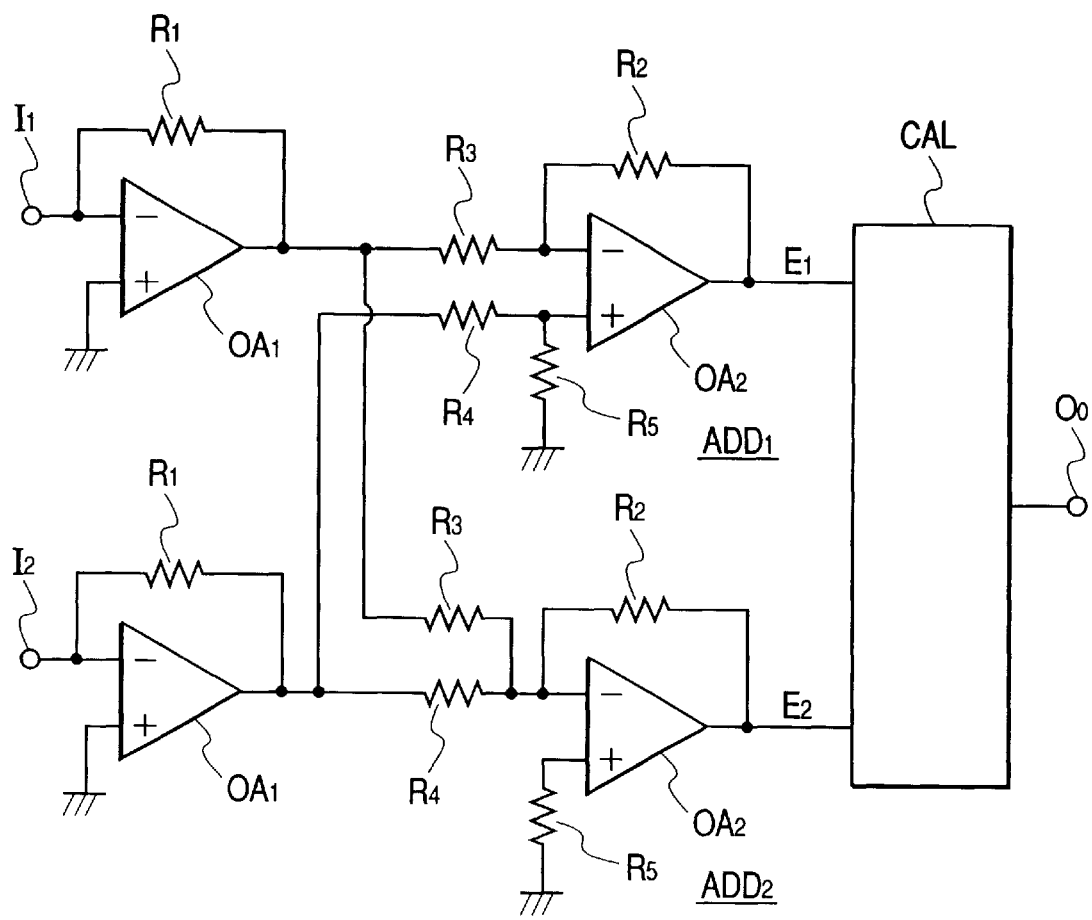
FIG. 3 is a circuit diagram of an arithmetic circuit for obtaining a rotation angle of a cantilever.

In the above cases, the rotation angle of the cantilever is found by detecting a difference between currents acquired from the photo-diode output terminals $O_1$ through $O_4$. FIG. 3 is a circuit diagram of a typical arithmetic circuit for obtaining the rotation angle of the cantilever, the circuit corresponding to the position sensor 9 that incorporates the photo-diodes 11 and 12 shown in FIGS. 2A and 2B. The photo-diodes 11 and 12 output currents that are led to input terminals $I_1$ and $I_2$ as shown in FIG. 3. From the input terminals, each of the currents is introduced into a current-voltage conversion amplifier composed of an operational amplifier $OA_1$ and a resistor $R_1$. The currents are converted to voltage signals that are easy to handle when output. The voltage signals with their polarities indicated in FIG. 3 are input to adders $ADD_1$ and $ADD_2$ each made up of an operational amplifier $OA_2$ and resistors $R_2$ through $R_5$. The adder $ADD_1$ yields a voltage signal $E_1$ denoting the sum of outputs from the photo-diodes 11 and 12, and the adder $ADD_2$ produces a voltage signal $E_2$ representing the difference between the outputs from the photo-diodes 11 and 12. A divider CAL performs a divide operation of $(E_1 - E_2)/(E_1 + E_2)$. At an output terminal $O_0$ of the divider CAL appears a voltage corresponding to the rotation angle of the cantilever, free of the effects caused by fluctuations in the laser beam output from the semiconductor laser diode 1. Alternatively, the divider CAL may be constituted by an operational amplifier arrangement for converting received analog voltage signals to digital format.

A comparison of FIG. 2A with FIG. 2B clearly indicates a greater share of light being received by one of the photo-diodes 11 and 12 in the setup of FIG. 2B. The outputs of the two photo-diodes reflect the difference in the quantity of received light. A voltage representing the difference appears at the output terminal $O_0$ as the voltage corresponding to the rotation angle of the cantilever.

In the setups of FIGS. 2C and 2D, the above processing is carried out on the assumption that the sum of outputs from the photo-diodes 11 and 13 corresponds to the output of the photo-diode 11 in FIGS. 2A and 2B and that the sum of outputs from the photo-diodes 12 and 14 represents the output of the photo-diode 12 in FIGS. 2A and 2B. When carried out on that assumption, the processing not only provides the rotation angle of the cantilever, but also produces at the output terminal $O^0$ a voltage corresponding to a rotation angle perpendicular to the cantilever rotation angle obtained by the setups of FIGS. 2A and 2B. Adding up the two rotation angles provides a signal representative of torsion of the cantilever 110.

The examples above are based on another assumption that the reflecting surface of the cantilever 110 is perpendicular to the optical axis of the incident light and that the light spot occurs as shown in FIGS. 2A and 2C. However, this is not a mandatory precondition for implementing the invention. Where the center of the beam light deviates from the optical axis in the initial state, the initial value involved may be retained in memory and a difference may be obtained between that value and a subsequent signal obtained during a read operation. This alternative arrangement obviously permits acquisition of the rotation angle of the cantilever relative to its starting position regardless of the initial deviation.

How the probe 101 is initialized is outlined below. With this embodiment, the rotation angle detector 10 gets no output from the position sensor 9 when the cantilever 110 is in a free state. In other words, the reflected light SP from the cantilever 110 does not reach any photo-diodes in the position sensor 9. In that state, a write instruction signal W or a read instruction signal R is fed to the main controller 120. In turn, the main controller 120 outputs the control signal 129 to the Z-drive controller 130. Given the control signal 129, the Z-drive controller 130 supplies the drive signal 125 to the Z-coarse actuator 126. This causes the cantilever 110 to approach the surface of the recording medium 102. The cantilever 110 starts rotating affected by a force from the surface of the recording medium 102. As a result, the reflected light SP from the cantilever 110 reaches the photo-diodes of the position sensor 9. A further coarse movement in the Z-axis direction entails transition from the state of FIG. 2B to that of FIG. 2A. Initialization of the probe 101 is complete after the Z-drive controller 130, having received the control signal 129, has stopped the coarse motion with the output of the position sensor 9 changed from the state of FIG. 2B to that of FIG. 2A.

A write operation takes place as follows: the above-described initialization is first carried out in response to the write instruction signal W. Then an initialization complete signal is sent illustratively over the signal line 151 to the main controller 120. In turn, the main controller 120 feeds the pulse voltage source 108 with the signal 150 to be written corresponding to the input write data signal WD. The main controller 120 also sends the drive signal 121 to the motor 122. This forms on the recording medium 102 concave structures 103 reflecting the write data signal. While the concave structures 103 are being formed, the cantilever 110 rotates. The cantilever rotation is detected by means of the output of the position sensor 9, so that the cantilever 110 is followed by the Z-fine actuator 124 and Z-coarse actuator 126. This allows the force exerted on the probe 101 to remain constant.

A read operation takes place as follows: the above-described initialization is first carried out in response to the read instruction signal R. Then an initialization complete signal is sent illustratively over the signal line 151 to the main controller 120. In turn, the main controller 120 sends the drive signal 121 to the motor 122 and the drive signal 127 to the track control actuator 128. This causes the probe 101 to move along tracks of the recording medium 102. Various techniques of tracking have been proposed, any of which may be adopted to implement this crucial process. One effective tracking technique proposed by the inventors of this invention in U.S. Pat. No. 5,808,977 on the basis of the laser beam deflection detection method may be utilized advantageously. The probe 101 is either positioned or not positioned in a concave structure 103 depending on the recording medium 102 being rotated. In its initial state, this embodiment of the invention presupposes the probe 101 being not positioned in a concave structure 103. Once the probe 101 is positioned in a concave structure 103, the reflected light SP received by the position sensor 9 from the cantilever 110 undergoes an abrupt change from the state of FIG. 2A to that of FIG. 2B. Sensing that change allows the concave structure 103 to be detected. The change, represented by a signal, is sent over the signal line 151 to the main controller 120 which in turn yields the read data signal RD. As in the case of the write operation, the rotation of the cantilever 110 is detected so that the cantilever 110 is followed by the Z-fine actuator 124 and Z-coarse actuator 126. This allows the force exerted on the probe 101 to remain constant.

Figure 4:
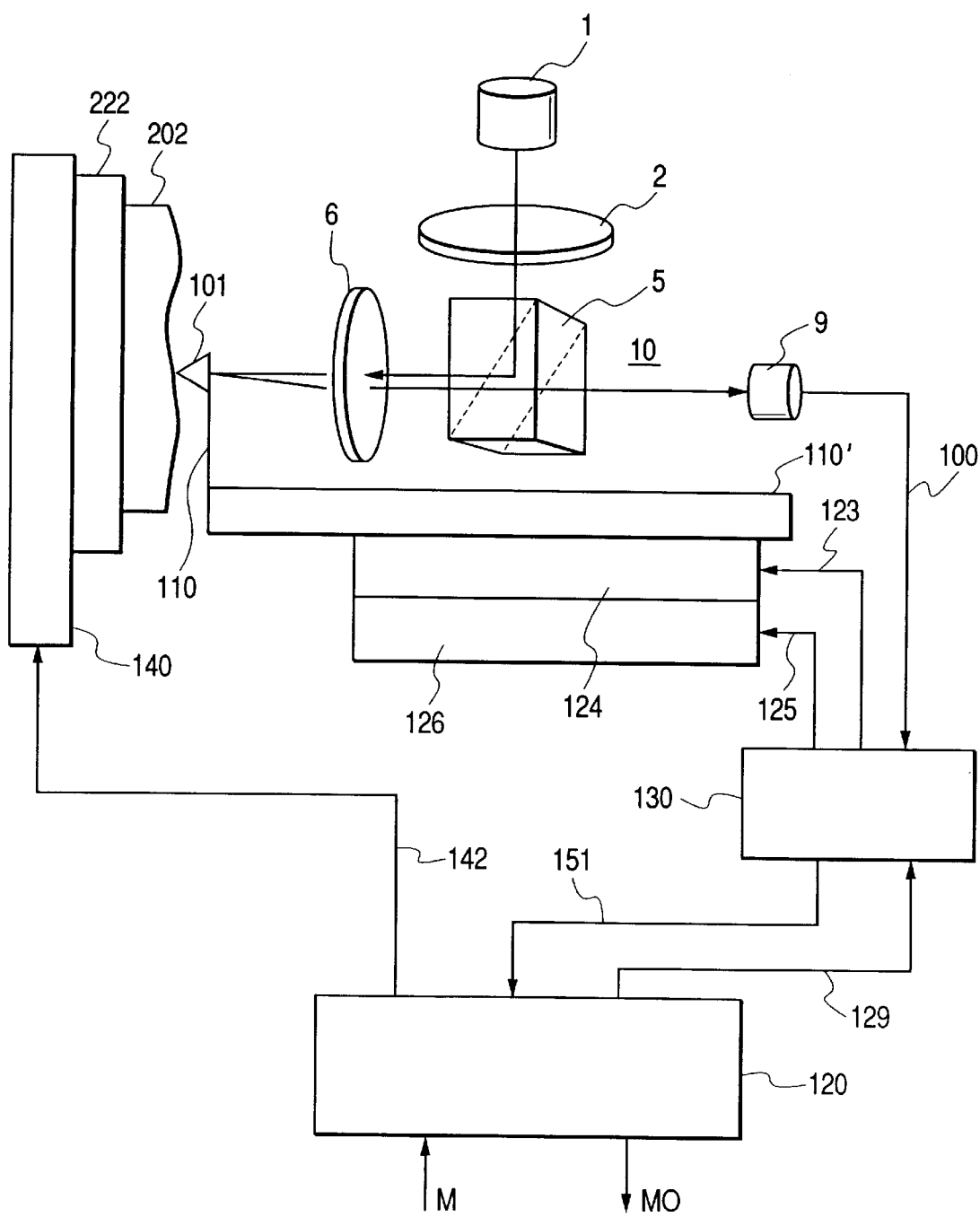
FIG. 4 is a schematic block diagram of a microscope (surface observing apparatus) practiced as another embodiment of this invention.

FIG. 4 is a schematic block diagram of a microscope (surface observing apparatus) practiced as a second embodiment of this invention. The second embodiment constitutes the above-mentioned type of atomic force microscope.

Reference numeral 202 stands for a sample to be observed, 222 for a sample holder, and 140 for an XY scanner that drives the sample holder 222 in the X and Y directions. As with the track control actuator 128, the XY scanner 140 is housed in the main body, not shown, of the recording and reproducing apparatus. The XY scanner 140 drives the sample holder 222 in the X and Y directions in response to a drive signal. Reference numeral 101 stands for a probe and 110 for a cantilever (with a cantilever spring). A tip of the cantilever 110 is furnished with the probe 101 made of silicon (Si) doped with impurity elements. The cantilever 110 is mounted on a base 110' forming an integrated structure fabricated by semiconductor fabrication techniques. The base 110' of the cantilever 110 is retained by a Z-fine actuator 124 which in turn is fixed by a Z-coarse actuator 126. A Z-drive controller 130 supplies drive signals 123 and 125 to the Z-fine actuator 124 and Z-coarse actuator 126 respectively. The Z-coarse actuator 126 is attached to the main body, not shown, of the recording and reproducing apparatus and is used to drive the probe 101 in the Z direction in accordance with the supplied drive signal. The Z-drive controller 130 receives an output 100 of a position sensor 9 of a rotation angle detector 10. A main controller 120 receives an observation instruction signal M from the outside, and outputs an observation output signal MO. The main controller 120 also sends a drive signal 142 to the XY scanner 140 and a control signal 129 to the Z-drive controller 130. Furthermore, the main controller 120 receives over a signal line 151 an observation output signal from the Z-drive controller 130 that accepts the output 100 of the position sensor 9 in the rotation angle detector 10. As in the case of the above-described recording and reproducing apparatus, the control signal 129 is used as a trigger to initialize a relative positional relationship between the probe 101 and the sample 202.

The rotation angle detector 10 will now be described. The function of the rotation angle detector 10 is twofold: to observe sample surfaces, and to initialize the probe 101. The rotation angle detector 10 of the second embodiment is basically the same as that of the recording and reproducing apparatus in FIG. 1, except that incident light to the cantilever 110 is bent in its optical path by 90 degrees by a beam splitter 5. Reference numeral 1 stands for a semiconductor laser diode and 2 for a collimator lens. A laser beam emitting surface of the semiconductor laser diode 1 is positioned at the focal point of the collimator lens 2. A laser beam emitted by the semiconductor laser diode 1 is converted by the collimator lens 2 into parallel rays. The parallel rays are bent by 90 degrees by the beam splitter 5 and are focused by an objective lens 6 onto the tip of the cantilever 110. The light reflected by the tip surface of the cantilever 110 is converted by the objective lens 6 into parallel rays. If the reflecting surface is perpendicular to the optical axis of the objective lens 6, the reflected light rays trace the incident optical path back to the cantilever 110 before reaching the position sensor 9 by way of the beam splitter 5. If the reflecting surface is rotated within a predicted small range relative to a perpendicular to the optical axis of the objective lens 6, then the reflected light rays deviate somewhat from the incident optical path to the cantilever 110 but trace through a predetermined effective optical range back to the beam splitter 5 before reaching the position sensor 9. As with the Z-coarse actuator 126 and XY scanner 222, the rotation angle detector 10 is housed in the main body, not shown, of the recording and reproducing apparatus.

The output of the position sensor 9 is processed in the same manner as with the recording and reproducing apparatus, and no description will thus be made of the processing. The initialization of the probe 101 is the same as with the recording and reproducing apparatus, and will not be described further.

How a sample surface is observed will now be described. The initialization takes place and is completed in response to the observation instruction signal M. Then an initialization complete signal is sent illustratively over the signal line 151 to the main controller 120. In turn, the main controller 120 sends the drive signal 142 to the XY scanner 140, driving the sample holder 222 accordingly in the X and Y directions. As the sample 202 is being driven in the X and Y directions, its surface profile changes and so does the position of the probe 101. This causes the cantilever 110 to rotate. A signal change in the position sensor 9 resulting from the cantilever rotation is transmitted to the Z-drive controller 130 over the signal line 100. In keeping with the rotation angle, the Z-drive controller 130 outputs the drive signals 123 and 125 to the Z-fine actuator 124 and Z-coarse actuator 126 respectively to keep constant the force exerted on the probe 101. The signal change caused by the rotation of the cantilever 110 is also sent from the position sensor 9 to the main controller 120 over the signal line 151. In response, the main controller 120 outputs the observation output signal MO along with position signals corresponding to the X and Y drive signals.

As described, the outgoing and incoming light beam traces substantially the same optical path in the embodiments based on the laser beam deflection detection method. Thus according to the invention, the recording and reproducing apparatus and the surface observing apparatus may be reduced significantly in size.

Figure 5:
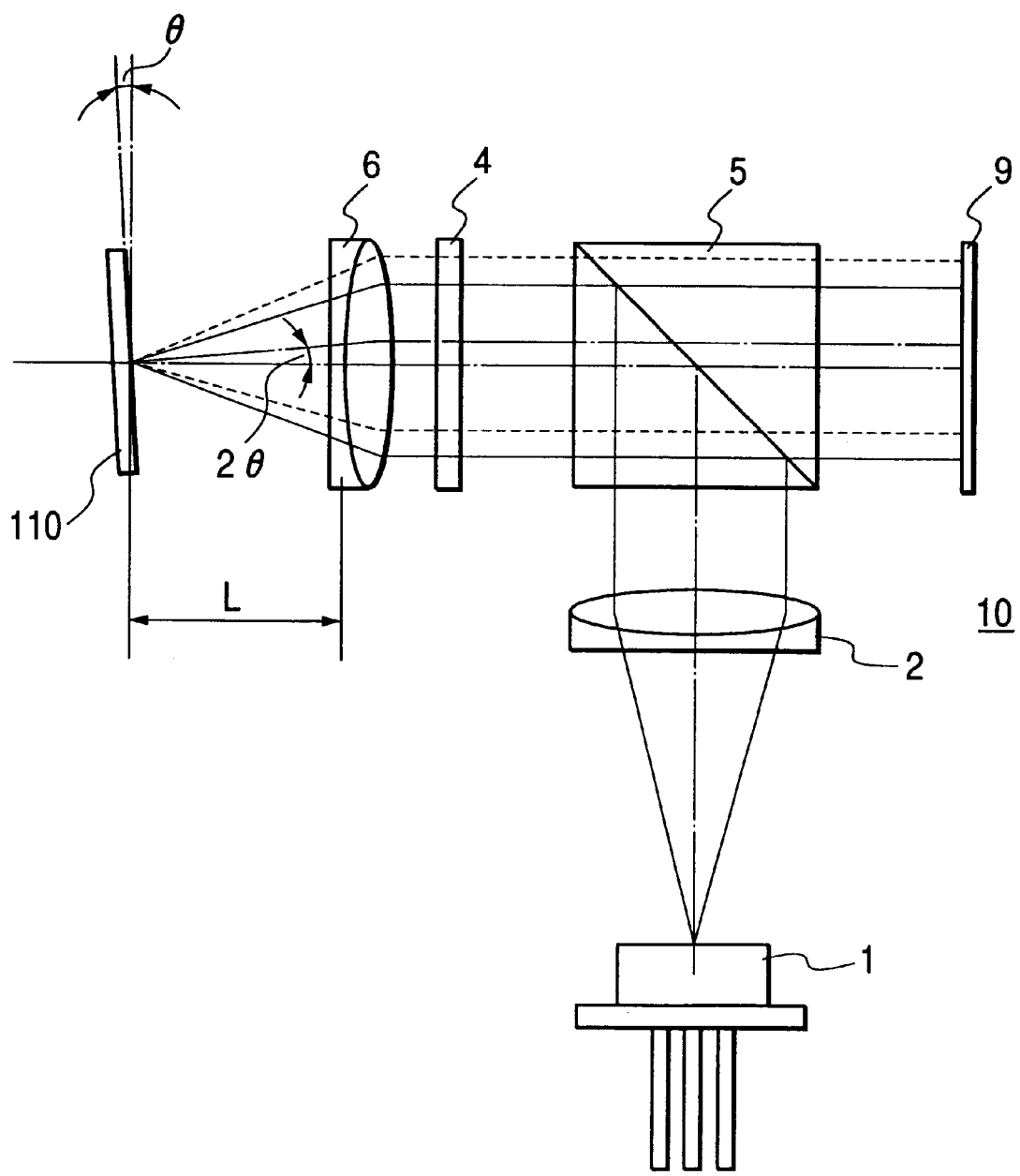
FIG. 5 is a schematic view of a rotation angle detector for use by the surface observing apparatus of FIG. 4.

Referring to FIG. 5, the rotation angle detector 10 will now be described in more detail with emphasis on its optics. FIG. 5 schematically depicts the rotation angle detector 10 for use by the surface observing apparatus of FIG. 4. In FIGS. 5 and 4, like reference numerals designate like or corresponding parts.

A laser beam emitting surface of the semiconductor laser diode 1 is positioned at the focal point of the collimator lens 2. A laser beam emitted by the semiconductor laser diode 1 is converted by the collimator lens 2 into parallel rays. The parallel rays enter a polarization beam splitter 5. Generally, the laser beam emitted by the semiconductor laser diode 1 is a linearly polarized light beam. It is assumed for the setup of FIG. 5 that the plane of polarization of the laser beam from the semiconductor laser diode 1 is parallel to the surface of this sheet of paper showing the figure. As illustrated, the polarization beam splitter 5 is adjusted to reflect most of the incident laser beam in the direction of the cantilever 110. The laser beam reflected by the polarization beam splitter 5 is converted by the quarter-wave plate 4 to circularly polarized light that is focused by the objective lens 6 onto the surface of the cantilever 110. The light reflected by the surface of the cantilever 110 is converted by the objective lens 6 to parallel rays. If the surface of the sample is perpendicular to the optical axis of the objective lens 6, the reflected light rays trace back the incident optical path to the cantilever 110 to reach the polarization beam splitter 5. Because the reflected light is the circularly polarized light rotated in the opposite direction of the incident light, the light rays passing through the quarter-wave plate 4 turn into linearly polarized light having a plane of polarization parallel with this sheet of paper showing the figure. Most of the reflected light entering the polarization beam splitter 5 passes therethrough to reach the position sensor 9. The reflected light beam having reached the position sensor 9 develops a position change that is detected illustratively as a light spot change on the two- or four-photo diode arrangement depicted in FIGS. 2A through 2D.

Suppose that the cantilever 110 is rotated by an angle of θ as shown in FIG. 5 and that a change in distance between the objective lens 6 and the cantilever 110 is negligible. In that case, the center of the light beam reflected by the surface of the cantilever 110 takes an angle of 2 θ relative to the center of the incident light beam on the position sensor 9 in FIG. 5. If the angle θ is sufficiently small, then the center of the reflected light beam having reached the objective lens 6 is deflected by 2 θ L from the center of the incident light beam, L being the focal length of the objective lens 6. The reflected light beam is converted by the objective lens 6 to parallel rays having that deflection. The converted parallel rays pass through the polarization beam splitter 5 to reach the position sensor 9. When the deflection of the light beam center is sufficiently small with respect to the light spot diameter, the position sensor 9 located as indicated provides an output that varies in proportion to the angle θ of deflection.

Figure 6:
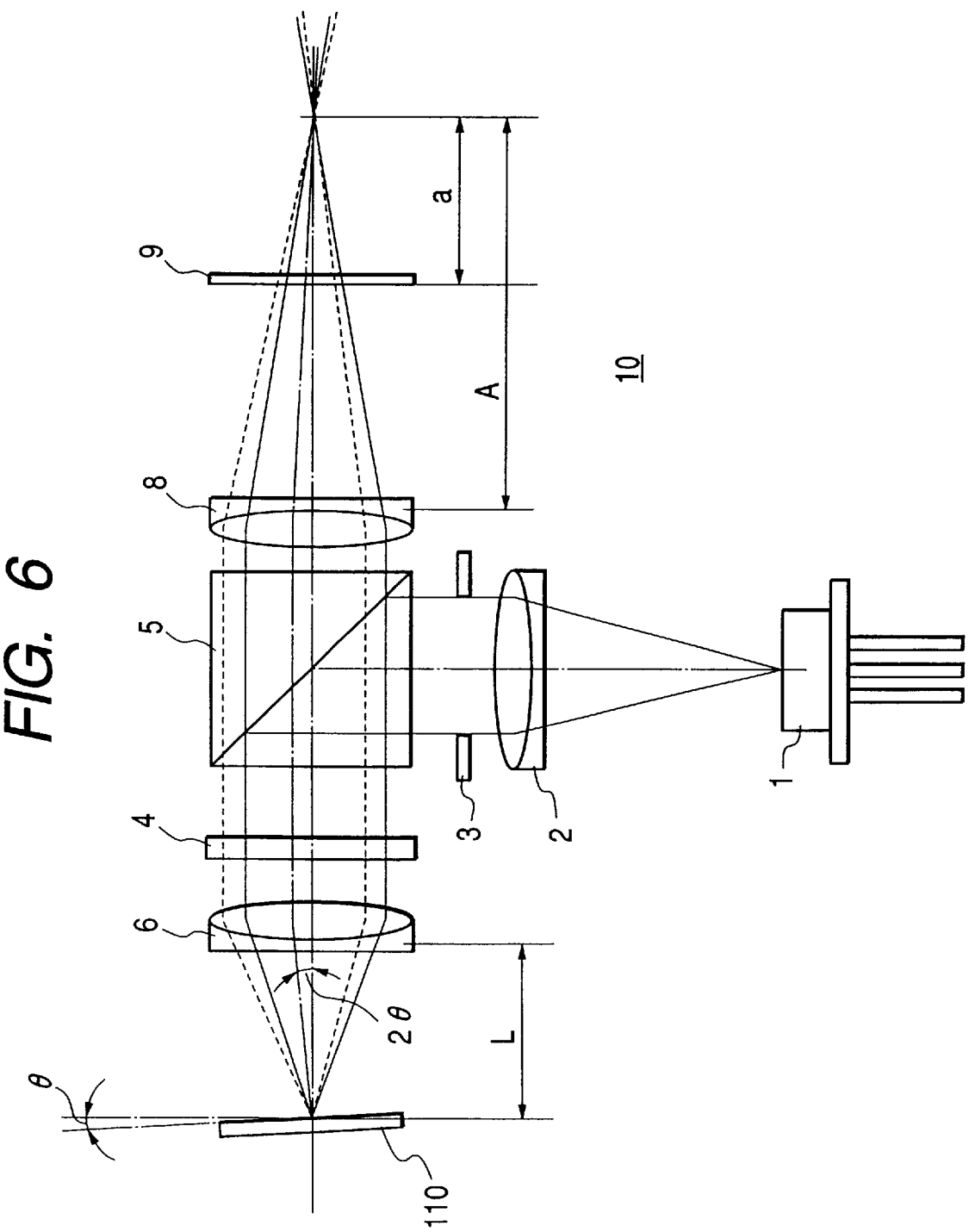
FIG. 6 is a schematic view of a variation of the rotation angle detector shown in FIG. 5.

FIG. 6 is a schematic view of a variation of the rotation angle detector 10 shown in FIG. 5, with the incident light spot made smaller on the cantilever 110 and with the position sensor 9 reduced in size. The setup of FIG. 6 differs from that of FIG. 5 in that a stop 3, a quarter-wave plate 4 and a lens 8 are added, with the position sensor 9 displaced by a distance of "a" from the focal point of the lens 8.

The rotation angle detector 10 of FIG. 6 works as follows: a laser beam emitted by the semiconductor laser diode 1 is converted by the collimator lens 2 to parallel rays. The parallel rays are adjusted in shape and diameter when passing through the stop 3. Past the stop 3, the rays enter the polarization beam splitter 5. Generally, the laser beam emitted by the semiconductor laser diode 1 is a linearly polarized light beam. It is assumed for the setup of FIG. 6 that the plane of polarization of the laser beam from the semiconductor laser diode 1 is parallel to the surface of this sheet of paper showing the figure. As illustrated, the polarization beam splitter 5 is adjusted to reflect most of the incident laser beam in the direction of the cantilever 110. The laser beam reflected by the polarization beam splitter 5 is converted by the quarter-wave plate 4 to circularly polarized light that is focused by the objective lens 6 onto the surface of the cantilever 110. If the surface of the cantilever 110 is equivalent to a metal surface, the light reflected thereby changes in phase by $-\pi$. That is, the plane of polarization of the circularly polarized light after reflection is rotated in the direction opposite to that of the incident light. The reflected light is converted by the objective lens 6 to parallel rays. If the reflecting surface of the cantilever 110 is perpendicular to the optical axis of the objective lens 6, the reflected light rays trace back the incident optical path to the cantilever 110 to reach the polarization beam splitter 5. Because the reflected light is the circularly polarized light rotated in the opposite direction of the incident light, the light rays passing through the quarter-wave plate 4 turn into linearly polarized light having a plane of polarization parallel with this sheet of paper showing the figure. Since the polarization beam splitter 5 is adjusted as described above, most of the incident reflected light passes therethrough to reach the lens 8. The reflected light is focused by the lens 8. A light spot is formed on and detected from the position sensor 9 located by the distance "a" from the focal point of the lens 8 on its optical axis. In the setup of FIG. 6, the center of the light beam at a point away from the focal point of the lens 8 by the distance "a" is defined as $2\theta La/A$, where A stands for the focal length of the lens 8. The spot diameter on the photo-diode arrangement is defined as $(A-a)/A$, different from that in FIG. 5. Thus if the polarization of the light beam center is sufficiently small relative to the light spot diameter, the position sensor 9 located as indicated provides an output that represents the rotation angle of the cantilever 110 in terms of position changes of the probe 101.

Figure 7:
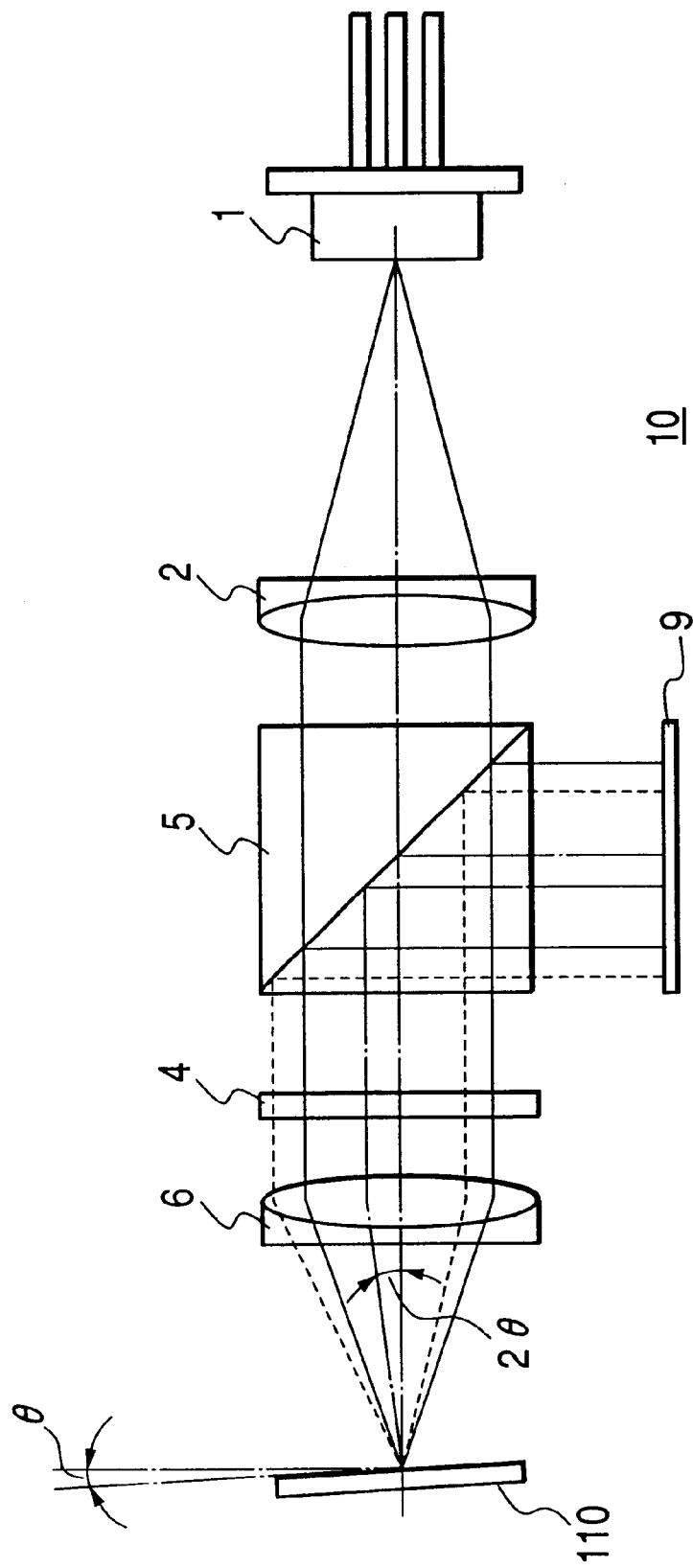
FIG. 7 is a schematic view of another variation of the rotation angle detector in FIG. 5.
Figure 8:
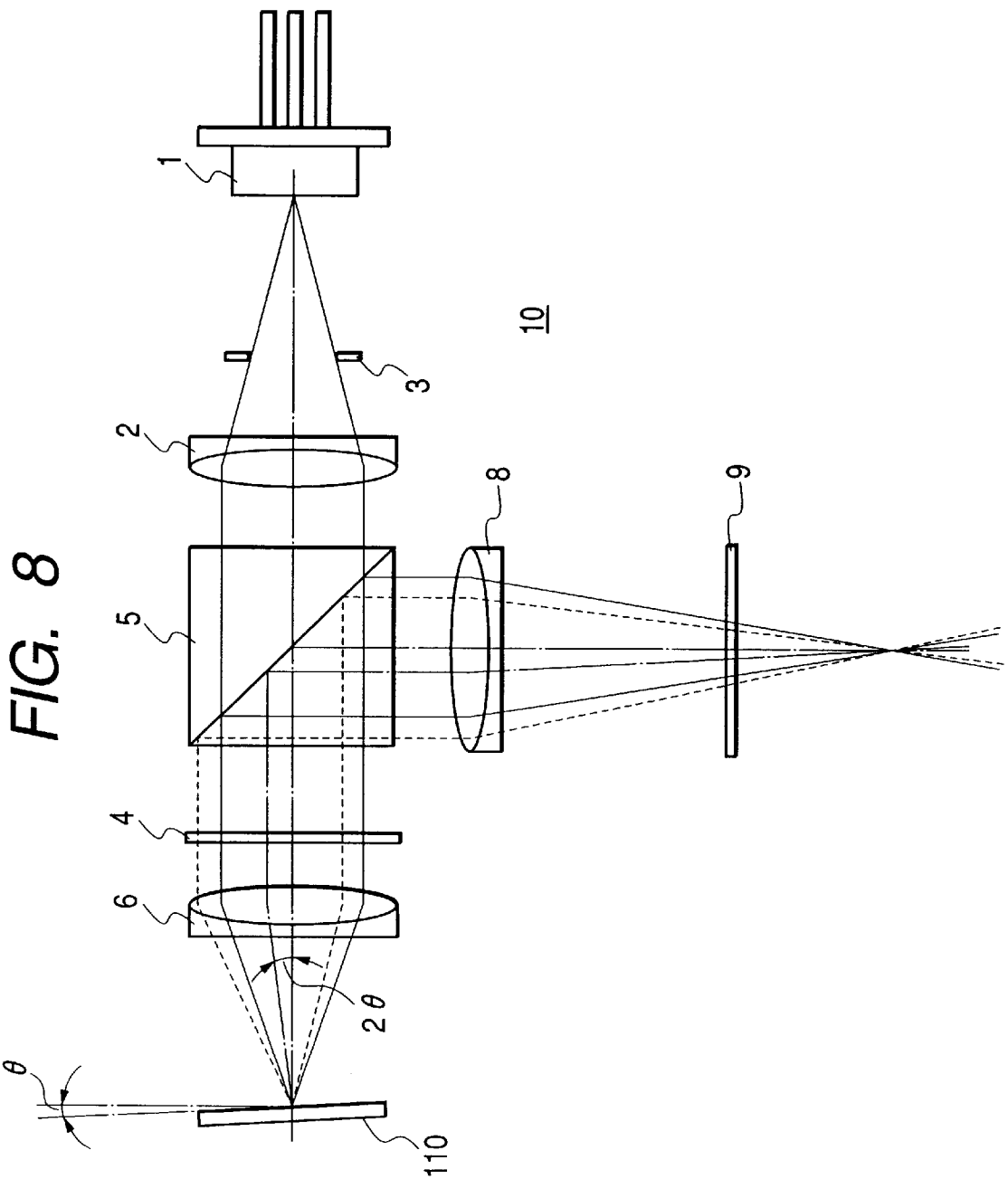
FIG. 8 is a schematic view of a further variation of the rotation angle detector in FIG. 5.

FIGS. 7 and 8 schematically show further variations of the rotation angle detector 10 with emphasis on their optics. In FIGS. 7 and 8, those parts with their counterparts already shown in FIGS. 5 and 6 are given the same reference numerals, and descriptions of such parts are omitted. Throughout these variations, any desired optics may be employed as long as a sufficiently focused light spot is emitted to the reflecting surface of a very small cantilever. Illustratively, the polarization beam splitter may be replaced by an optical isolator.

As many apparently different embodiments of this invention may be made without departing from the spirit and scope thereof, it is to be understood that the invention is not limited to the specific embodiments thereof except as defined in the appended claims.

What is claimed is:

1. A recording and reproducing or observing apparatus based on single laser beam deflection detection method, the apparatus comprising a probe attached to a first surface of a cantilever, a member with a plane facing said probe, and a rotation angle detector including:

an objective lens for focusing parallel rays onto a focal point located on a second surface of said cantilever different from the first cantilever surface holding said probe;

reflected light detecting means for detecting reflected light resulting form light that is incident on and reflected by said second surface at said focal point; and angle detecting means including a collimator lens, a polarizing beam splitter and a plurality of photo-diodes being operated differentially for detecting, from data about the reflected light detected, an angle between an optical axis of said parallel rays and said second surface of said cantilever;

wherein the parallel rays from said collimator lens are incident upon said polarizing beam splitter.

2. A recording and reproducing apparatus according to claim 1, wherein a force is exerted on said probe to record concave structures on said plane of said member which faces said probe.

3. A surface observing apparatus according to claim 1, wherein said cantilever is adjusted in position based on an output of said rotation angle detector so as to keep constant a force occurring between said probe and said plane of said member which faces said probe.

4. A recording and reproducing apparatus according to claim 2, wherein said force exerted on said probe is generated by a voltage applied to a piezo electric device holding said cantilever which retains said probe.

5. A surface observing apparatus according to claim 3, wherein a relative positional relationship between said probe and said plane of said member which faces said probe is varied within a predetermined region of said plane of said member.

6. A recording and reproducing apparatus according to claim 2, wherein a relative positional relationship between said probe and said plane of said member which faces said probe is varied within a predetermined region of said plane of said member.

7. A recording and reproducing apparatus according to claim 2, wherein said cantilever is adjusted in position based on an output of said rotation angle detector so as to keep constant said force exerted on said probe to record concave structures on said plane of said member which faces said probe.

8. A recording and reproducing or observing apparatus based on a laser beam deflection detection method according to claim 1, further comprising reflected light detecting means for detecting, through a condenser lens, reflected light resulting form light that is incident on and reflected by said second surface of said cantilever different from said first surface thereof, said reflected light detecting means being positioned at a point different from a focal point of said condenser lens.

9. A recording and reproducing or observing apparatus based on a laser beam deflection detection method according to claim 1, further comprising a quarter-wave plate and a polarizing beam splitter located in a region where incident light on said second surface of said cantilever different from said first surface thereof and reflected light from said second surface are in parallel.

* * * * *